United States Patent [19]

Chevalier

[11] 4,257,403
[45] Mar. 24, 1981

[54] PLANE SOLAR ENERGY COLLECTOR WITH MILTICELLULAR TRANSPARENT COVER

[76] Inventor: Laurent P. Chevalier, Quartier de la Garde, Route de Veynes, 05000 Gap, France

[21] Appl. No.: 958,621

[22] Filed: Nov. 8, 1978

[30] Foreign Application Priority Data

Nov. 10, 1977 [FR] France ............................. 77 34377

[51] Int. Cl.³ .............................................. F24J 3/02
[52] U.S. Cl. .................................................. 126/449
[58] Field of Search ...................... 126/449, 450, 417

[56] References Cited

U.S. PATENT DOCUMENTS

| 2,625,930 | 6/1950 | Harris . |
| 3,982,527 | 9/1976 | Cheng . |
| 4,007,728 | 2/1977 | Guba ................... 126/449 |
| 4,069,809 | 1/1978 | Strand .................. 126/449 |
| 4,178,911 | 12/1979 | Matteson ............... 126/449 |

FOREIGN PATENT DOCUMENTS 2375556 12/1976 France .
2399629 8/1977 France .

*Primary Examiner*—Herbert F. Ross

[57] ABSTRACT

The object of the invention is a plane solar energy collector provided with multicellular transparent cover compound of adjoining juxtaposed identical cells wherein each cell is inscribed or formed inside a polygonal base frame and comprises a lenticonic elements i.e. having a substantially plane face, defined by a side of the said polygon, and by a bow-shaped curve, crossing-the two ends of the said side and, on the other hand, a convex transparent surface which connects the other sides of the base frame to the said curve.

11 Claims, 8 Drawing Figures

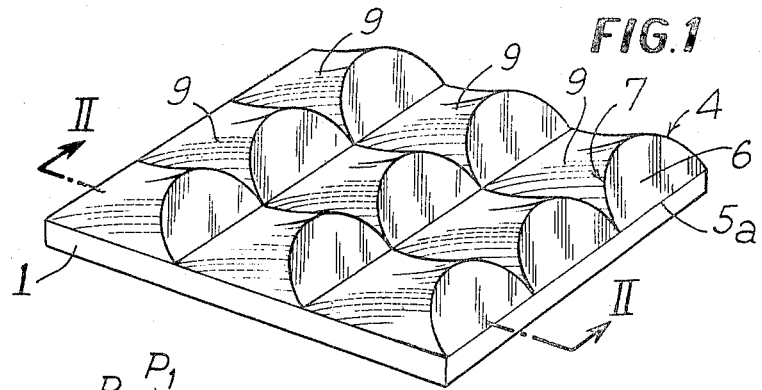
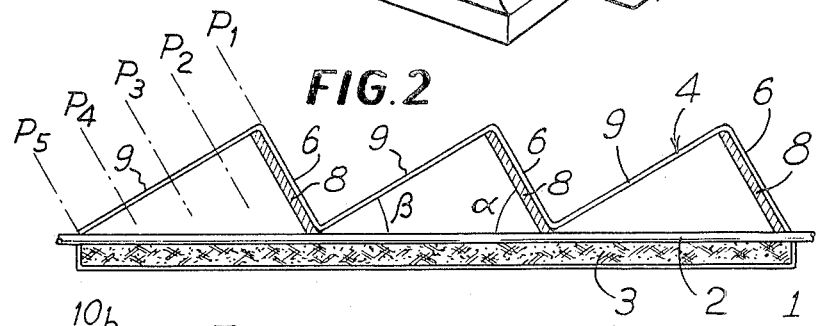
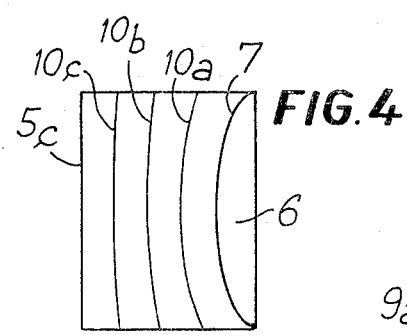
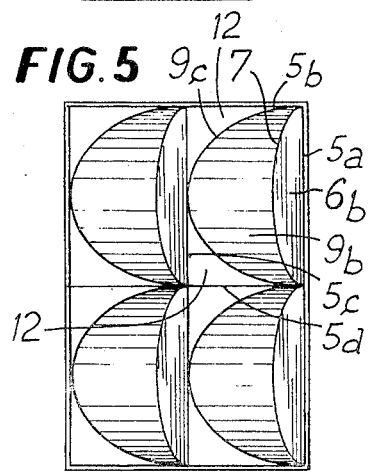
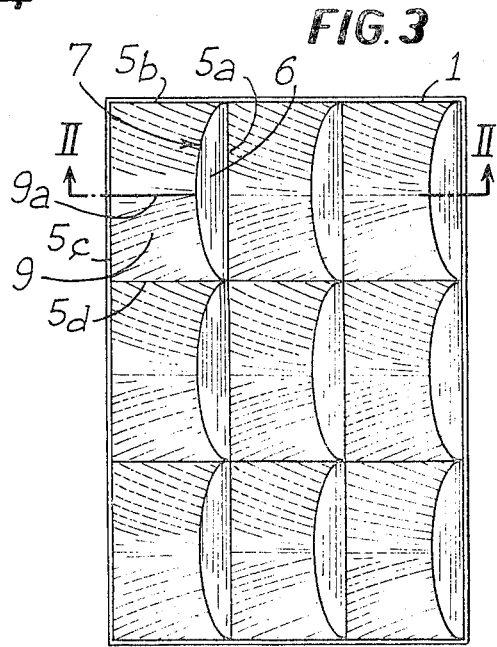

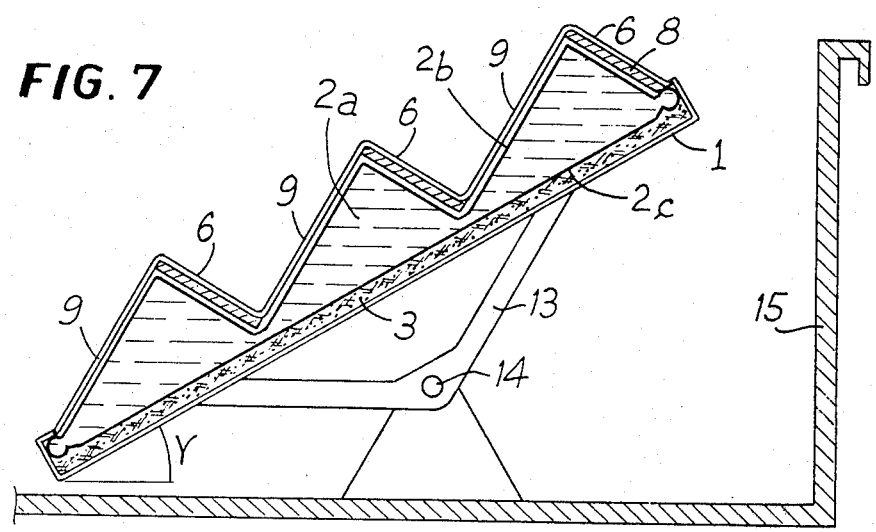
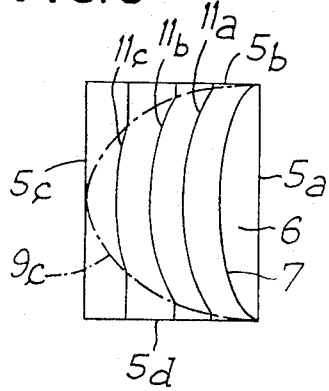
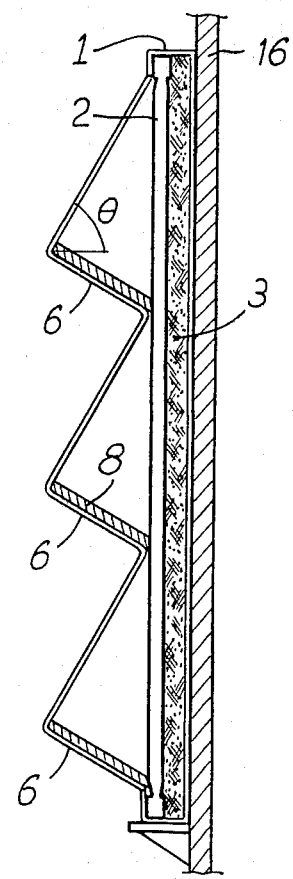

PLANE SOLAR ENERGY COLLECTOR WITH MULTICELLULAR TRANSPARENT COVER

The present invention relates to solar energy collectors having a multicellular transparent cover.

The technical field of the invention is that of the construction of solar energy collectors.

Plane solar energy collectors comprise, in known manner, an absorber or radiator wherein flows a heat-carrying fluid, which is heated by the solar rays and said absorber is placed under a transparent cover creating a greenhouse effect. Generally, the transparent cover is a simple plane plate and the collector is faced South. In this case, when the sun is in the East or in the West, the rays strike the plane cover obliquely and a large part of the solar energy is reflected, which considerably reduces the efficiency of the collector and the heat energy collected per unit of surface.

It is also desirable to incline the plane collectors with respect to the horizontal plane in order to bring them as near as possible to a position perpendicular to the solar rays. This inclination varies with the latitude of the location and with the season, and the ideal angle formed by the plane of the collector and the horizontal plane increases seasonally when the height of the sun reduces, and it reaches its maximum value at the winter solstice, when the ideal inclination is for example 60° at a latitude of 40°.

A consequences of such an inclination is that the collectors catch the wind over a large surface, and also that they throw shade over one another if they are juxtaposed in the North-South direction. They are unsightly when placed on a flat roof.

If the said plane collectors are against a vertical wall or built-in a front wall, it is no longer possible to place them perpendicularly to the solar rays and the output of the collection is not at optimum.

Another problem resides in the material used for producing the transparent covers of the plane collectors.

Ordinary glass is not recommended as this material is too fragile. Tempered glass is expensive and does not allow the shaping of the cover. The use of plane plates of transparent plastics shows some disadvantages because of the high coefficient of expansion of plastic materials.

An object of the present invention is to provide plane collectors which can overcome the aforesaid disadvantages.

Some plane collectors are already known of which the transparent cover is multicellular, i.e. composed of a plurality of juxtaposed identical cells. For example, collectors are known of which the cover is composed of a series of parallel rounded ribs forming a magnifying glass, placed in the North-South direction, or of juxtaposed spherical swellings. Collectors are also known of which the transparent cover is rippled or is provided with a sawtooth cross-section of which the ribs are disposed in an East-West direction.

The present invention proposes new collectors with a multicellular transparent cover whose structure is different from that of the already known multicellular covers and which gives better results.

Each lenticonic cell composing the multicellular transparent cover of a collector according to the invention is inscribed in a polygonal base frame, a rectangular one for example. It comprises on the one hand, a plane or substantially plane face which is defined by a first side of the said base frame and by a bow-shaped curve crossing the two ends of the said first side and, on the other hand, a surface whose convexity is directed outwardly of the collector, which surface connects the other sides of the said base frame to the said curve.

Preferably the plane of the plane face forms an angle of about 60° C. with the plane of the base frame of each cell.

Preferably, the curved line defining the plane face is shaped as an arc of circle.

The section of the convex surface of each cell crossing the median plane of the first side of the base frame is a straight or substantially straight line, forming an angle of about 90° with the said plane face.

Preferably, the transparent cover of a collector according to the invention is composed of one or more plates made from a thermoplastic transparent material which has been thermo-shaped.

According to a special embodiment, the absorber of a collector according to the invention is also composed of a plurality of lenticonic cells of which the front face takes substantially the shape of the cover.

A collector according to the invention may be mounted on a horizontal or substantially horizontal surface, for example on the terrace roof of a building. In this case, the plane of the collector, which is parallel to the plane of the base frames of the cells, forms with the plane of the horizontal surface, an angle which may vary between 0° and about 30°, depending on the season, so that the angle of incidence of the solar rays onto the cover is near to 60°. In this application, the plane faces of the cells are directed northwards.

A collector according to the invention may also be mounted vertically, for example against a facade wall or any vertical wall and in this case, the plane faces of the cells are directed towards the ground.

The invention leads to new plane solar energy collectors comprising an asymmetrical multicellular transparent cover.

A first advantage of the special lenticonic shape of the cells of the cover of a collector according to the invention resides in the fact that the said collector can be mounted on a surface which is either horizontal or slightly inclined with respect to the horizontal plane as well as weather-boarded against a vertical wall.

In both cases, the plane face of the cells which faces either the North or the ground, remains in shadow. Said faces may be heat insulated. Furthermore, in both cases, the solar rays fall on the conic convex transparent surfaces of the cells with an angle of incidence which remains substantially constant from morning till night, therefore making it possible to avoid any reflection losses during the morning and the evening.

The collectors according to the invention may be mounted on a horizontal support and, in this case, the convex transparent surfaces form an angle of the order of 30° with the horizontal plane which is quite suitable for the summer in an average latitude of about 40°.

In winter, when the height of the sun reduces, the collector support only needs to be tilted by an angle varying between 0° and 30° for the transparent surface to make with the horizontal plane an angle varying between 30° and 60° and for it to remain substantially perpendicular to the solar rays.

The surface exposed to the wind is virtually nil in summer when it reduces to the height of the cells. In winter, it reduces by more than half compared with that of a collector with plane cover thereby reducing the loss of calories and the risks of damage by the wind. Moreover, it is easy to shield the collectors mounted on a terrace by an acroter wall of reduced height.

When the collectors according to the invention are mounted vertically, for example against a facade wall, the convex transparent surface of the cells is inclined by about 60° on the horizontal plane and this inclination leads to a good yield during the winter in a latitude of about 40°. In such a case, from an architectural point of view, the facades are not spoilt seeing that the relief of the collectors is very low with respect to the facade wall. In profile, the collectors remain substantially merged with the facade wall. Moreover, the plane faces that are visible from the ground may be tinted in different shades so as to obtain varied surface effects.

A particularly interesting advantage of the covers according to the invention is that they can be produced by thermo-shaping plates of a transparent thermoplastic material, such as polycarbonate, polyesters, etc.

It is thus possible to produce for a relatively low price, surfaces of complex shape, from a fairly inexpensive material. Moreover, considering that the multicellular covers of the collectors according to the invention are in three planes, the large expansions due to the variations of temperature are absorbed for the most part by the deformation of the convex surfaces and any lateral expansions in the plane of the base frame are very small, which avoids any risks of blistering and of permanent deformation of the transparent covers as well as any deterioration of the sealing joints.

The following description is given with reference to the accompanying drawings which illustrate non-restrictively, some examples of embodiments of the collectors according to the invention.

FIG. 1 is a perspective view of a modified lenticonic multicellular collector panel according to the invention.

FIG. 2 is a cross-sectional view of the said panel along plane II—II.

FIG. 3 is a top view of the said panel.

FIG. 4 shows five sections of the transparent surface of a cell by five successive planes parallel to the plane face showing the modification from true conic sections.

FIG. 5 is a top view of a variant embodiment showing true lenticonic sections mounted in each cell element.

FIG. 6 shows five cross-sections of the transparent surface of the variant shown in FIG. 5.

FIG. 7 is an elevational view of a mounted application of a collector according to the invention.

FIG. 8 is an elevational view of a second mounted application of a collector according to the invention mounted vertically.

FIGS. 1, 2 and 3 show a panel of a plane solar energy collector comprising a casing or assembly frame 1 which contains absorber 2.

A heat-carrying fluid, for example a liquid, flows in the absorber 2 where it is heated by the solar rays which fall onto the front face of the absorber. The rear face of the absorber 2 is thermally insulated by an insulating blanket 3. The front face of the casing is closed by a transparent cover 4, giving a greenhouse effect. This structure is found in all the conventional plane collectors. The panel illustrated on the figures is of reduced size. It is of course possible to build collectors of any surface size by juxtaposing several adjoining panels.

The cover 4 of a collector according to the invention is multicellular, which means that it is composed of a plurality of juxtaposed identical cells, such as nine cells, in the case shown in FIGS. 1 to 3. Its thickness is constant.

Each cell is inscribed inside a base frame which, in the case of FIG. 1, is rectangular. It is to be noted that the said base frame may have another polygonal shape, such as square, hexagonal or any other polygonal shape which may be juxtaposed to identical polygons in order to cover up a plane.

The base frame comprises a plurality of sides, for example sides 5a, 5b, 5c and 5d in the case of a rectangular frame. Each cell comprises a first plane, or substantially planar, face 6 whose plane is inclined with respect to the plane of the base frame forming therewith an angle $\alpha$ of about 60°.

In the case of a slightly bent surface 6, it is the plane which is about parallel to said surface along the first side 5a, which forms an angle $\alpha$ with the plane of the base frame.

The plane of the face 6 crosses a first side 5a of the base frame and the plane face is defined by said first side and by a bow-shaped curve 7 which crosses the ends of the side 5a. The curve 7 is for example an arc of circle, but it could also be an arc of ellipse, of a parabola, of an oval etc. It is an arched line of which the concavity is directed towards the base frame and which is symmetrical with respect to the median plane of the side 5d.

Said plane face 6 is meant to be facing northwards, or the ground or to remain in shadow. It needs not be transparent. It includes, preferably, a heat-insulating coating 8. Each cell also has a transparent surface 9 whose convexity is directed towards the outside of the collector. Said surface may have somewhat different shapes, basically all modified conic sections through the base of the cone.

Surface 9 thus connects the curve 7 defining the plane face, to the other sides 5b, 5c and 5d of the base frame.

The section of this surface by a plane such as the plane II—II which is perpendicular to the base frame and which crosses the middle of the side 5a and the vertex of the curve 7, i.e. by the median plane of the side 5a, is a straight line 9a which is substantially perpendicular to the plane face 6 and therefore forming with the plane of the base frame an angle $\beta$ of nearly 30°, since the angle $\beta$ is complementary to the angle $\alpha$.

As a variant, the ridge line 9a may be slightly bent and have for example a slight concavity inwards, but it still approximates an angle of 90° with the plane of the face 6 and the intersection with side 5c.

FIG. 3 shows a convex surface 9 which is a crooked surface with no geometrical shape which can be defined with any precision but generally it is a streamlined conic section blended to sides 5b, 5c and 5d. The cross-sections of this streamlined surface by successive planes perpendicular to the ridge line 9a are arcs more and more oblate.

FIG. 4 shows five consecutive sections. The first section, which is the section by the plane face 6, is the curve 7 shaped as an arc of circle. The other lines 10a, 10b, 10c, 5c are sections by four parallel planes P2, P3, P4, P5 shown in FIG. 2. They are arcs, more and more oblate, of which the chord length remains constant. The surface 9 is transparent and its convexity is directed upwards, i.e. toward the outside of the collector.

FIG. 5 shows a variant of embodiment wherein the transparent surface 9b of each cell is composed of portions of a cylindrical conic or surface of which the generating lines are perpendicular to the plane face 6b. These conic or cylindrical surfaces cut across the plane of the base frame along an ellipse 9c and spaces between the sides 5b, 5c, 5d and the ellipse 9c are sealed off by plane transparent surfaces 12.

FIG. 6 shows five successive sections by five planes P1, P2, P3, P4, P5 of the embodiment shown in FIG. 5.

The lines 11a, 11b, 11c are arcs of circle. The trace of the ellipse 9c is shown by a dotted line.

According to a preferred embodiment, the transparent cover 4 is composed of one or more plates of a transparent thermoplastic material, such as polycarbonate or polyester, which plates are thermoshaped on a heated mold into the multicellular cover of this invention thereby permitting the production of complex-shaped surfaces at a relatively small cost.

Of course, the transparent cover 4 may also be produced by other means, such as for example, injecting a transparent plastic material into a mold, or with shaped glass plates.

FIG. 2 shows a collector according to the invention, mounted on a horizontal support, the plane faces 6 facing northwards and the transparent surfaces 9 facing southwards.

The transparent surfaces form with the horizontal plane an angle $\beta$ of the order of 30° and the solar rays are then perpendicular to the surface 9 when the height of the sun is 60° which corresponds to the position of the sun in summer in a latitude of 40°.

As shown in FIG. 7, in order to improve the angle of incidence of the solar rays on the transparent surface during the winter, it is possible to mount the collector on a support 13 mounted to pivot about a horizontal axis 14, whereby the collector can be inclined with respect to the horizontal plane at an angle $\gamma$.

Due to the inclination of the transparent surfaces 9, it is sufficient that the angle $\gamma$ varies between 0° and 30°, for the transparent surfaces 9 to remain substantially perpendicular to the solar rays in all seasons in a latitude below 40°. As a result, the total height of the collector when said latter is inclined at a maximum, i.e. when the angle $\gamma$ is about 30°, is less than the height of a conventional plane collector which would have to be inclined by 60° in order to obtain the same angle of incidence of the solar rays. An acroter wall 15, of reduced height will suffice to shield completely the collectors according to the invention which are mounted on a terrace roof. In this way the collectors catch less wind and the acroter wall is adequate enough to shield them from the wind.

FIG. 7 shows a variant of embodiment wherein the absorber 2a is not a plane absorber as in the case of FIG. 2 but rather with a front face 2b which adopts substantially the shape of the cover so that the solar rays fall perpendicularly on the said front face, thereby improving the coefficient of absorption.

In this case, the rear face 2c of the absorber may be plane as is shown in FIG. 7, or else it may be parallel to the front face so that the thickness of the sheet of heat-carrying fluid remains constant.

Such a multicellular absorber may be produced by press-stamping metal sheets, such as copper sheets or sheets of aluminium alloy or of stainless steel.

The cells of the absorber may be produced separately and interconnected by means of tubes. It is also possible to stamp simultaneously a plurality of absorber cells which are intercommunicating as shown in FIG. 7.

FIG. 8 shows another application of the collector according to the invention mounted vertically, for example against a facade wall 16. In this application, the plane faces 6 of the cells are directed towards the ground.

The transparent surfaces 9 form with the horizontal plane an angle $\theta$ which is of the order of 60° and therefore these surfaces are perpendicular to the solar rays when the height of the sun is 30°, i.e. in winter, in latitudes of 40° to 50°. The yield is therefore maximum in winter, when this is most essential.

FIG. 8 shows by way of example a collector fitted with a plane absorber 2. It could also be fitted with the multicellular absorber 2a shown in FIG. 7.

By way of example, the dimensions of a cell are 400 mm for the sides 5b and 5d, 600 mm for the sides 5a and 5c and 200 mm for the rise of the curve 7, but of course the dimensions of the walls may vary.

It is understood that the various elements constituting the examples of embodiment hereinabove described may be replaced by other equivalent elements fulfilling the same functions, without departing from the scope of the invention.

I claim:

1. A plane solar energy collector comprising a caloric absorber in which flows a heat-carrying fluid and a multicellular transparent cover of substantially constant thickness, comprising a plurality of juxtaposed identical cells each cell comprising a polygonal base frame, a substantially plane face which is defined by a first side of the said base frame and by a bow-shaped curve crossing the two ends of the first side and a convex transparent surface of which the convexity is directed towards the outside of said collector, which surface is connected to each of the remaining sides of each said polygonal base frame and to said bow-shaped curve thereby forming said individual cells.

2. The solar energy collector as claimed in claim 1 wherein the plane tangential to the said substantially plane surface along the said first side forms an angle of about 60° with the plane of the said base frame.

3. The collector as claimed in claim 1 wherein the said curve is an arc of circle.

4. The collector as claimed in claim 1 wherein the section of the said convex surface of each cell by the plane that is median and perpendicular to the first side of the base frame is a substantially straight line, forming an angle of about 90° with the said substantially plane face.

5. The collector as claimed in claim 1 wherein the said transparent cover is composed of one or more plates of a transparent thermoplastic material which plates have been thermo-shaped.

6. The collector according to claim 1 wherein the said absorber is also composed of a plurality of cells whose front face, directed towards the transparent cover, substantially adopts the shape of the said multicellular cover.

7. The collector as claimed in claim 1 wherein the plane faces of the said cells are heat insulated.

8. The collector as claimed in claim 1 wherein the plane of the said base frames is articulately mounted and pivoted with respect to the horizontal plane so as to form therewith an angle varying between 0° and 30° depending on the seasons and on the latitude, and the said substantially plane faces of the cells are directed northwards.

9. The collector as claimed in claim 1 whereby the plane of the said base frames is mounted vertically and said substantially plane faces of the cells are directed towards the ground.

10. The collector according to claim 1 wherein the curved convex surface is a lenticonic surface and with said bow-shaped plane face defines a conic or oblique cylindrical section, the base of which section, is said plane face, and the apex of said section extending to the opposite side of said polygonal base.

11. The collector according to claim 1 wherein said lenticonic surface is modified by streamlining to blend with each other polygonal base side.

* * * * *